Feb. 5, 1963  E. HENRY-BIABAUD  3,076,517
CABIN FOR VEHICLE PRIMARILY DESIGNED
FOR UTILITY PURPOSES
Filed Sept. 8, 1961  2 Sheets-Sheet 2
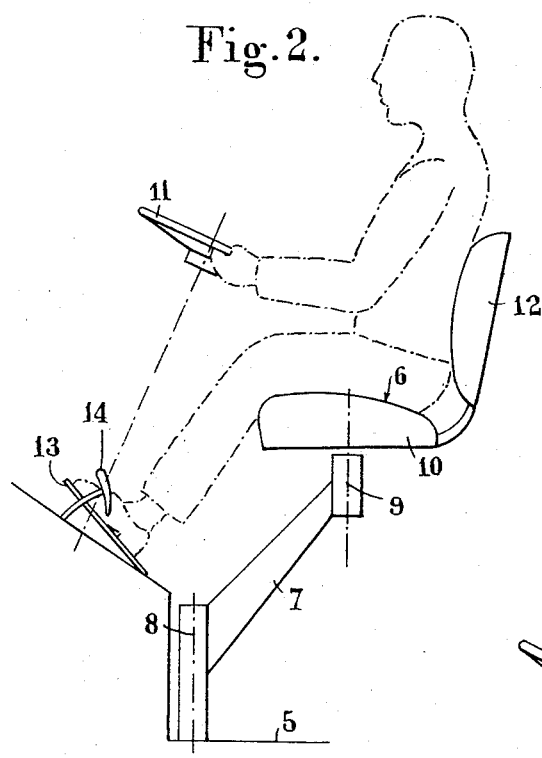
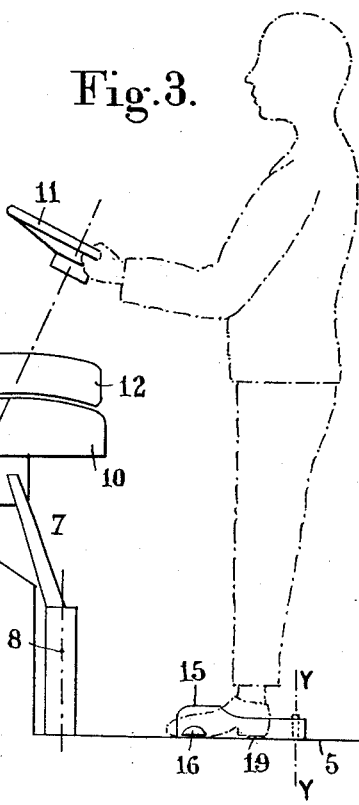
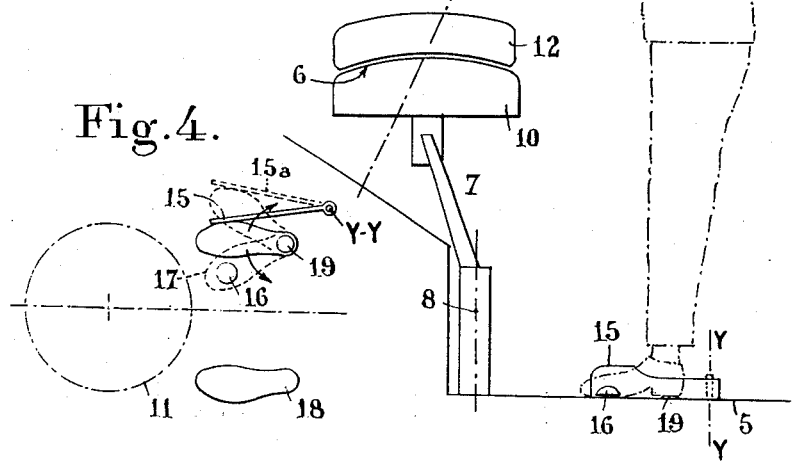

3,076,517
CABIN FOR VEHICLE PRIMARILY DESIGNED FOR UTILITY PURPOSES

Edmond Henry-Biabaud, Paris, France, assignor to Societe Anonyme Andre Citroen, Paris, France
Filed Sept. 8, 1961, Ser. No. 136,870
Claims priority, application France Nov. 14, 1960
4 Claims. (Cl. 180—77)

The present invention concerns a cabin for a vehicle designed primarily for utility purposes, and is noteworthy for the versatility it offers in operation.

This cabin is characterized by the fact that it is fitted with two individual seats mounted in such a way that their position and the direction in which they face can be changed at will, their dimensions being, in relation to the dimensions of the cabin, such that considerable longitudinal and transversal movement is possible without interference.

Suitable seats would be of the type described in the French Patent No. 1,269,682, filed on July 4, 1960 by the applicant, and entitled: "Seat designed more particularly to equip utility vehicles"; such seats can in fact pivot about two separate vertical axes, one pivot point being located on the floor, the other under the seat ieself.

These two seats are so designed that they can pivot fully causing interference between the legs of the person seated, the sides of the cabin, and the other seat.

In particular, while the vehicle is moving, the assistant can swing around so as to face the rear and prepare the delivery to be effected; he can, in addition, occupy any other desired position.

The assistant's seat can be folded away under the dash panel or against the forward wall of the vehicle, the back of the seat folding down for this purpose; it can also be removed easily in the event that the driver should have need of the entire cabin space.

The ease with which the seats can be pivoted allows the driver to step to the ground in one motion, without going through the usual gymnastics, and to regain his place just as easily.

The passenger can do likewise when there is a side door on his side.

The cabin can be provided with a double set of pedals; the upper set is used for driving in the seated position, while the lower set is used only when the driver is in a standing position, in which case his seat can be swung under the dash panel or up against the forward wall of the cabin.

The cabin floor is entirely flat and free of all protuberances, and the middle of the doors is located preferably on a line with the seats in their normal position, in order to obtain maximum freedom of movement.

More details will be given hereafter concerning several preferred forms of embodiment of the present invention, reference being made to the accompanying drawing, wherein:

FIGURES 2, 3 and 4 are elevation and plan views of lay-out variations.

Figure 1:
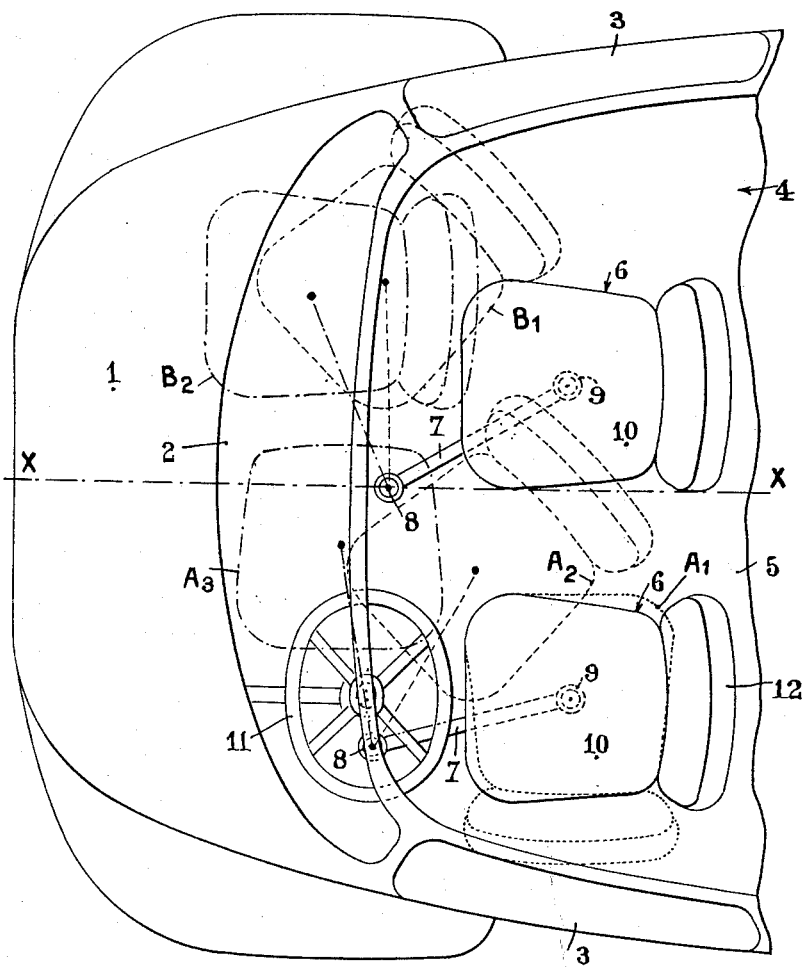
FIGURE 1 is a schematic plan view of the cabin, with vehicle top removed.

The drawing shows the forward part 1 of the vehicle, the windshield 2, the sliding or swinging doors with windows 3, the cabin 4 and floor 5.

The supports 7 for the seats 6 are angled and pivot about a vertical axis 8 with pivot point on the floor 5; each support arm has a vertical sleeve providing a pivoting axis 9 for the seat 10. The vertical axis of rotation of the seat of the driver, an integral part of the floor of the cabin, is best located in the transverse vertical plane passing through the centre of the steering wheel 11, while the axis corresponding to the seat of the assistant is located in the vertical plane containing the longitudinal axis "XX" of the cabin, in the vicinity of the above-mentioned transversal plane of the centre of the steering wheel.

Positions A1, A2 and A3 of the driver's seat correspond respectively to a ninety-degree turn about axis 9 in order to face the assistant's seat, to a forty-five degree turn about axis 8 in order to clear the driver's side for the loading of merchandise, and to a ninety-degree turn about axis 8, after folding the back 12 against the seat 10, in order to place the seat under the dash panel or against the forward wall of the vehicle, thus permitting driving from a standing position.

Positions B1 and B2 give an example of two positions which the assistant's seat can occupy in order to clear the cabin if necessary; in addition, this seat can easily be removed.

Both seated and standing driving are provided by the fitting of two sets of pedals: one set is so located in relation to the seat that the driver can operate it easily and without fatigue, as in a standard automobile lay-out. The other set of pedals is set into the floor under the steering wheel.

An advantageous characteristic of the invention is that this set of pedals can include an accelerator pedal which is mobile about a vertical axis, i.e. which moves parallel to and in the plane of the floor; thus the driver can remain comfortably in a normal standing position and actuate the accelerator by rotating his foot horizontally; for this purpose, a slight protuberance, circular for instance, with a diameter of 3 to 5 centimeters and a height of a few millimeters, can be provided on the floor under the driver's heel, in order to facilitate this rotation. This movement is much more natural and especially less fatiguing than the vertical pivoting necessitated with a standard pedal; the latter movement involves a shifting of body weight and a tiring muscular effort in order to maintain the accelerator pedal in the desired position.

The brake pedal will best be in the form of a roundhead button with a short travel, as described in the French Patent No. 1,014,251, October 3, 1950, under the same name, in such a way that the driver's right foot upon leaving the accelerator pedal comes into immediate contact with the said round-head button by a simple rotation to the left.

The lay-out is shown in FIGURES 2, 3 and 4, where the pedals for seated driving are as follows: accelerator 13, brake 14; for standing driving: accelerator 15 mobile about axis YY, the brake 16, and the protuberance 19 on the floor. The dashed line indicates (FIG. 4) the foot positions for actuating the pedals.

This figure indicates the movements the driver must make; acceleration is accomplished by pivoting the foot to the right, moving the pedal 15 to 15a, for example, for a given speed; braking is obtained by pivoting the foot to the left, 17 for example, and exerting pressure on the brake control. The left foot 18 bears its normal share of weight without appreciable variations when the right foot moves the accelerator or keeps it held in position for a long time; the weight on the right foot is borne by the right heel during the pivoting movements; it is borne uniformly by the entire foot during steady driving and while exerting pressure during braking.

It is to be understood that many modifications can be brought to the form of embodiment described hereinabove with reference to the accompanying drawing, without thereby departing from the scope of the present invention.

What I claim is:

1. A cabin for a vehicle designed primarily for utility purposes and equipped with a steering wheel and having a longitudinal centre-line and a floor defining two levels, said vehicle comprising: two individual seats designed respectively for the driver of said vehicle and an assistant driver; angle-brackets, each having opposite ends respectively defining parallel axes, and each mounted in said cabin by one of said opposite ends with the parallel axis defined by said one end vertical and pivotable around said vertical axis for respectively supporting said seats, the angle-bracket supporting the driver's seat being pivotally mounted substantially in a transverse vertical plane passing through the center of said steering wheel, and the angle-bracket supporting the assistant driver's seat being pivotally mounted substantially in a vertical plane passing through said longitudinal centre-line of said cabin, said seats being respectively mounted on the other of said opposite ends of its associated angle-bracket to pivot about the parallel axes defined by said other end, said seats having backs that fold onto the associated seats, whereby said driver's seat is pivotable clear of said steering wheel and said assistant driver's seat is pivotable out of the way of said pivoted driver's seat; two sets of pedals, each set comprising a brake pedal and an accelerator pedal, located respectively on said two levels defined by said floor, said sets of pedals being respectively adapted to control said vehicle when the driver is seated and when he is standing, whereby when the seat of said driver is behind said steering wheel said driver is seated and uses one of said two sets of pedals to control said vehicle, and when the driver's seat is pivoted to one side of said steering wheel said driver is standing and uses the other of two sets of pedals.

2. Cabin according to claim 1 in which the accelerator pedal used for driving while the driver is in a standing position is mounted for rotation around a vertical axis supported by the floor of the cabin and the brake pedal which is used while driving in a standing position is the type of a round-head button with a short travel.

3. Cabin according to claim 2 comprising a slight protuberance on the floor of the vehicle at the place where the driver's right heel rests in a standing position behind said steering wheel in order to operate either the accelerator pedal or the brake pedal.

4. Cabin according to claim 2 in which the protuberance which serves as a heel rest is arranged in the vicinity of a transverse plane passing through the vertical axis of rotation of the accelerator pedal, between the brake and accelerator pedals.

References Cited in the file of this patent
UNITED STATES PATENTS

| | | |
|---|---|---|
| 1,333,338 | Polson | Mar. 9, 1920 |
| 1,639,371 | Freeman | Aug. 16, 1927 |
| 1,640,640 | Bourgon | Aug. 30, 1927 |
| 1,990,748 | Oberkircher et al. | Feb. 12, 1935 |
| 2,242,138 | Muma | May 13, 1941 |
| 2,565,666 | Schaefer | Aug. 28, 1951 |
| 2,700,411 | Lamb | Jan. 25, 1955 |